HERBERT PILLER
DAVID J. WHITE
INVENTORS

United States Patent Office 3,526,854
Patented Sept. 1, 1970

3,526,854
LARGE BAND-WIDTH LASER MODULATOR
Herbert Piller and David J. White, Riverside, Calif., assignors to the United States of America as represented by the Secretary of the Navy
Filed Nov. 12, 1968, Ser. No. 775,068
Int. Cl. H01s 3/18
U.S. Cl. 332—7.51                              1 Claim

ABSTRACT OF THE DISCLOSURE

The modulation of laser light by controlled variation of the polarization direction of the light waves using electric field modulation.

---

The invention herein described may be manufactured and used by or for the Government of the United States of America for governmental purposes without the payment of any royalties thereon or therefor.

Modulators of laser light have a great use in long distance communications systems, however there has been a lack of suitable high-frequency modulators. Prior art devices require high electric fields, whereas the present invention uses only up to 300 v./cm. at the maximum. Acoustic type devices are not capable of modulating high power lasers, whereas there is no such limitation in the present device. As a thin film device, the present invention also provides the operational advantage of low loss and smaller size than any prior type device.

The present modulator can be used in the infrared region, such as for $CO_2$ laser radiation. Electric field modulation is fast enough to respond to signals with frequencies of 100–1000 mHz., and the magnetic field is constant. With this invention, another type of modulation, called pulse-code modulation, can be used to transmit digitized information that is manipulated by computer circuits.

In this invention laser light waves are modulated by controlled variation of the polarization direction of the light waves for high frequency modulation. Polarization and amplitude modulation is used for this purpose. The modulation is based on the Faraday effect which is the rotation of the plane of polarization of light as it travels through a substance in a direction parallel to an applied magnetic field.

Other objects and many of the attendant advantages of this invention will become readily appreciated as the same becomes better understood by reference to the following detailed description when considered in connection with the accompanying drawings wherein.

Figure 1:
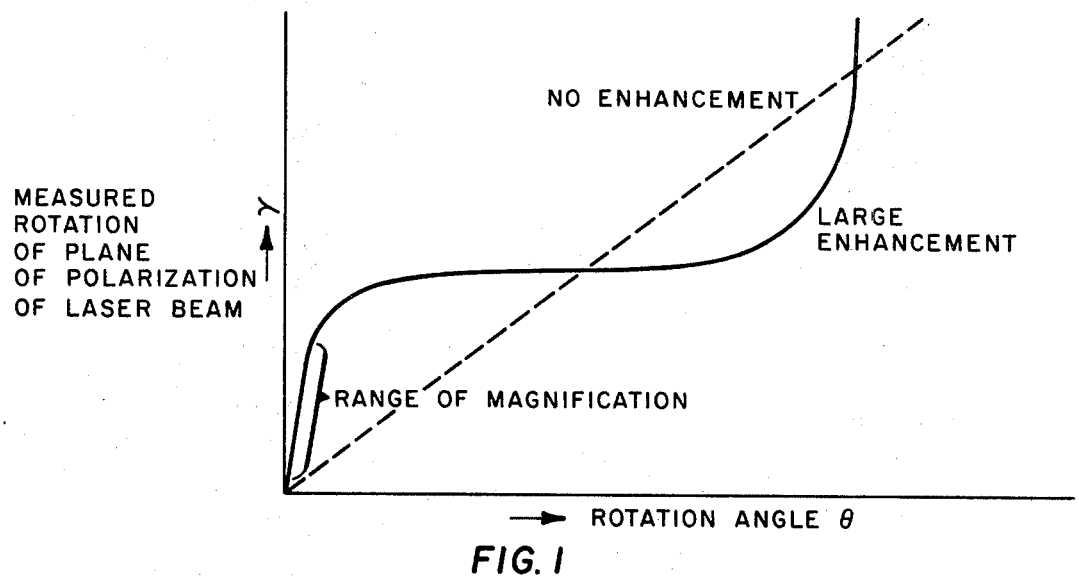
FIG. 1 shows the measured rotation of the plane of polarization of a laser beam with the present invention.
Figure 2:
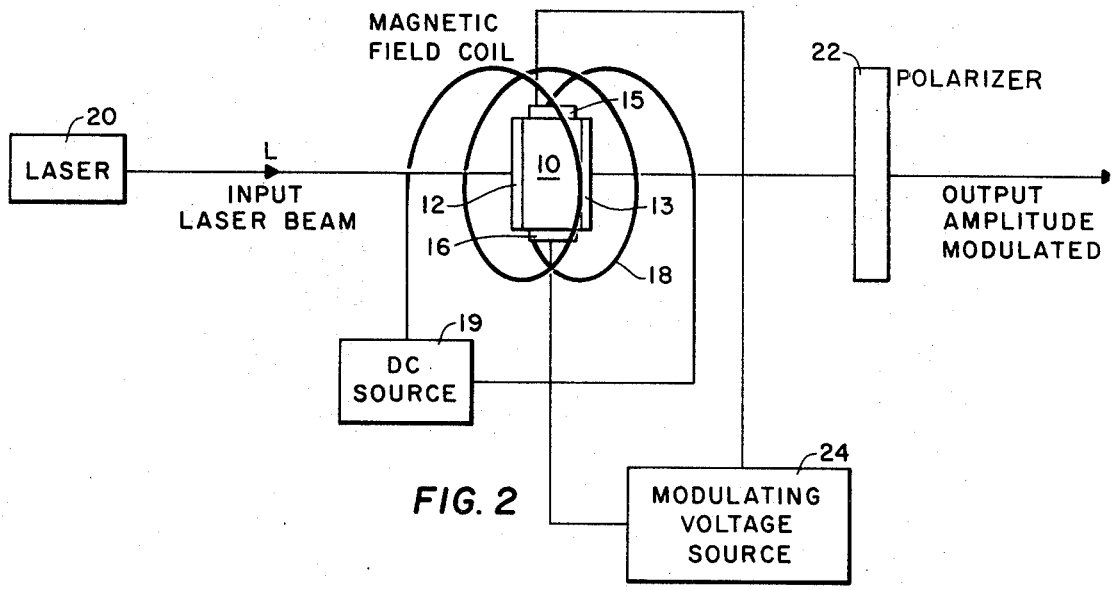
FIG. 2 shows an electric field magneto-optic laser beam modulator of the present invention.

In the modulator of this invention the plane of polarization of an infrared laser beam is rotated in a crystal of a semiconductor. The amount of rotation is determined by the modulating field. A polarizing prism converts the polarization modulation to amplitude modulation. The modulation of rotation is enhanced in a resonance cavity in a constant magnetic field and the intrinsic rotation is changed by an electric field. The intrinsic rotation change is amplified in the resonance cavity giving a much larger output rotation which can be changed rapidly by electric field modulation. The Faraday rotation in the crystal is enhanced by internal multiple reflections so that the measured rotation is much larger than the single transmission rotation. In this case of rotation enhancement a small change of the intrinsic rotation by an electric field gives a large change in the measured rotation on the modulator. The solid curve of FIG. 1 shows the measured rotation of the plane of polarization of the laser beam as a function of the intrinsic rotation $\theta$. $\theta$ itself is sensitive to the electric field and can be easily modulated by an electric field. Prior methods used only magnetic field modulation. Magnetic field modulation is, in general, slower than electric field modulation. The method of this invention can also be extended to pulse code modulation because the modulator can be driven by a pulsed electric field. FIG. 2 shows the electric field magneto-optic modulator. Semiconductor crystal 10 (e.g. GaAs) is covered with multilayer enhancement dielectrics 12 and 13 (e.g. Ge, Si or other III–V compounds) in order to form an enhancing resonance cavity. Electric contacts 15 and 16 on the semiconductor crystal 10 have an electric field applied thereto perpendicular or parallel to the magnetic field direction on crystal 10. The magnetic field is provided by the coil 18 connected to a D.C. source 19. The laser light L from laser 20 propagates along the magnetic field through the crystal. In normal operation lasers (as laser 20) are polarized in single or multimode operation because of the coherence conditions present in a laser cavity. The modulator, as described in the invention, is tuned to one wavelength of laser 20 and will, therefore, reject the other wavelengths for effective modulation except the one wavelength which is determined by the cavity resonance of the modulator in the case of multimode operation. Only one polarized wave is emitted from the laser in the case of single mode operation. In this case the modulator is tuned to that wavelength. One can also use a standard laser with Brewster angle windows which emit polarized laser light. After passing polarizer 22 the beam is amplitude modulated. Polarizer 22 may be a Glan Thompson prism, Polaroid polarizers, InSb polarizers, and the like, or Perkin-Elmer wire polarizers. The type of polarizer used is determined by the desired wavelength since different wavelengths require different polarizers. The modulating frequency is determined by the modulating voltage from source 24. The magnetic field H of coil 18 is constant. A permanent magnet can be used in place of coil 18. FIG. 1 shows the range of magnification where the modulation is most efficient.

This device has the advantage of being modulated by electric field only, and it is possible to perform wideband modulation. Another advantage is in modulating infrared and even far infrared lasers and MW masers. Most other type modulators are limited to the near infrared or the visible region of the electro-magnetic spectrum.

An alternative method is to modulate a crystal without using enhancement techniques, but using basically the same circuit. In FIG. 2, this would mean removing the dielectric enhancement layers 12 and 13, the effect would be represented in FIG. 1 by the straight line (dashed) indicated by no enhancement. In this alternate method, the semiconductor crystal 10 should be surface treated to prevent reflection loss.

The modulating electric field in the semiconductor crystal 10 affects the rotation $\theta$ (i.e. Faraday rotation) of the plane of polarization of the laser beam in three different ways, or combinations thereof, as follows:

(a) by the change of the effective mass of the conducting electrons by the addition of energy;
(b) by the change in the electron distribution in the crystal between different electronic states (i.e. energy bands) of the crystal; and
(c) by changing the electron distribution in a single asymmetric electronic state.

What is claimed is:
1. A large band-width laser beam modulator, comprising:
(a) a semiconductor crystal made of gallium-arsenide,
(b) a modulating voltage source for creating a modulating electric field connected across said semiconductor crystal,
(c) a means for generating a constant magnetic field on said semiconductor crystal,
(d) a polarizing means for converting polarization modulation of laser light waves to amplitude modulation wherein the plane of polarization of a laser light beam passing through said semiconductor crystal is rotated therein by an amount determined by the modulating electric field across said crystal and the beam being amplitude modulated on passing through said polarizing means,
(e) said semiconductor crystal having layers of enhancement dielectric made of a III–V compound provided thereon to create an enhancing resonance cavity therein where the modulation of rotation of the plane of polarization is enhanced on passing through said crystal, the intrinsic rotation change of said laser beam being amplified in said resonance cavity giving a much larger output rotation which is changed rapidly by said electric field modulation.

References Cited

UNITED STATES PATENTS 3,259,016   7/1966   Rosenblum _____ 332—7.51
3,414,728  12/1968   Patel _____ 332—7.51

OTHER REFERENCES

Shurcliff: "Polarized Light," Harvard Univ. Press, 1962, pp. 72, 73, 85.

RODNEY D. BENNETT, JR., Primary Examiner

D. C. KAUFMAN, Assistant Examiner

U.S. Cl. X.R.

250—199; 350—151